US012675662B2

(12) United States Patent
Kim et al.

(10) Patent No.: US 12,675,662 B2
(45) Date of Patent: *Jul. 7, 2026

(54) ACCESSIBLE CARD WITH IDENTIFICATION EMBOSSING

(71) Applicant: Truist Bank, Charlotte, NC (US)

(72) Inventors: Hyekyeng Lyn Kim, Matthews, NC (US); Carlos Lomena, Cary, NC (US)

(73) Assignee: Truist Bank, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/213,881

(22) Filed: May 20, 2025

(65) Prior Publication Data

US 2025/0284918 A1 Sep. 11, 2025

Related U.S. Application Data

(63) Continuation of application No. 18/063,132, filed on Dec. 8, 2022, now Pat. No. 12,333,366.

(51) Int. Cl.
G06K 19/077 (2006.01)
(52) U.S. Cl.
CPC ................................. G06K 19/077 (2013.01)
(58) Field of Classification Search
CPC ............................................... G06K 19/077
USPC ........................................................ 235/492
See application file for complete search history.

(56) References Cited

U.S. PATENT DOCUMENTS

| | | | |
|---|---|---|---|
| 6,793,141 B1 * | 9/2004 | Graham ................. | B42D 25/00 |
| | | | 235/487 |
| 11,775,793 B1 * | 10/2023 | Whiting ............. | G06K 19/0772 |
| | | | 235/380 |
| 12,333,366 B2 * | 6/2025 | Kim ................... | G06K 19/0772 |
| 2009/0200385 A1 * | 8/2009 | Hachey ................. | B42D 25/00 |
| | | | 235/494 |
| 2021/0110227 A1 * | 4/2021 | Harmon ............... | G09B 21/001 |
| 2024/0193583 A1 * | 6/2024 | Kim ..................... | B42D 25/324 |
| 2025/0285177 A1 * | 9/2025 | Young ................... | G06Q 40/02 |

OTHER PUBLICATIONS

Press Release: "Mastercard introduces accessible card for blind and partially sighted people" Oct. 25, 2021 (Year: 2021).*

* cited by examiner

*Primary Examiner* — Daniel A Hess
(74) *Attorney, Agent, or Firm* — Kilpatrick Townsend & Stockton LLP; Michael A. Springs, Esq.

(57) ABSTRACT

An accessible card can provide access to an account. The account card can include sides and an identification embossing for providing access to an account. The sides can be connected to form a shape. The identification embossing can be associated with at least one side of the sides. The at least one side associated with the identification embossing can include a first thickness and an arrangement of one or more tactile features. The first thickness can be different than a second thickness associated with other sides of the sides. The arrangement may indicate, via tactile interaction, an identification of the account associated with the account card or a card type of the account card.

20 Claims, 4 Drawing Sheets

400

Receive an accessible account card that includes an identification embossing or a textured directional feature — 402

Determine, based on the identification embossing or the textured directional feature, an account associated with the accessible account card — 404

Determine, based on the identification embossing or the textured directional feature, an orientation of the accessible account card — 406

Access, based on the orientation and using the accessible account card, the account — 408

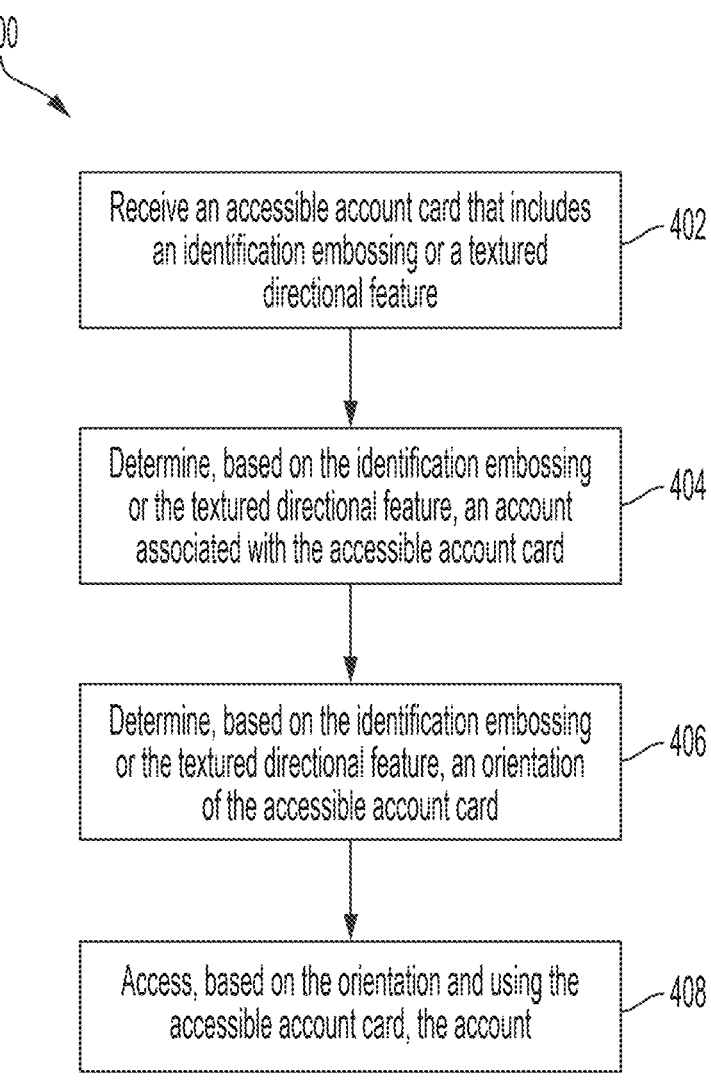

400

Receive an accessible account card that includes an identification embossing or a textured directional feature — 402

Determine, based on the identification embossing or the textured directional feature, an account associated with the accessible account card — 404

Determine, based on the identification embossing or the textured directional feature, an orientation of the accessible account card — 406

Access, based on the orientation and using the accessible account card, the account — 408

FIG. 4

ACCESSIBLE CARD WITH IDENTIFICATION EMBOSSING

CROSS-REFERENCE TO RELATED APPLICATIONS

This is a continuation of U.S. patent application Ser. No. 18/063,132, filed Dec. 8, 2022, titled ACCESSIBLE CARD WITH IDENTIFICATION EMBOSSING, the entirety of which is incorporated herein by reference.

TECHNICAL FIELD

The present disclosure relates to cards and, more particularly (although not necessarily exclusively), to an accessible card that includes an identification embossing.

BACKGROUND

An account can include a set of data controlled by a first entity, such as a user, and associated with a second entity such as a provider of services, etc. The second entity may issue an account card that can provide access for the first entity to the account. For example, the first entity can use the account card or information included with the account card to access the account via a computing device such as by logging onto an online version of the account, by logging into the account via a computing device provided by the second entity, and the like. But, the account may not be accessible to the first entity via the account card. For example, the first entity may experience a disability or may experience other similar challenges. The first entity may not be able to visually perceive the account card. For example, the first entity may not be able to identify the account card or read the information included with the account card due to colorblindness, vision impairment, and the like.

SUMMARY

In one example, an accessible card can provide access to an account. The account card can include sides and an identification embossing for providing access to an account. The sides can be connected to form a shape. The identification embossing can be associated with at least one side of the sides. The at least one side associated with the identification embossing can include a first thickness and an arrangement of one or more tactile features. The first thickness can be different than a second thickness associated with other sides of the sides. The arrangement may indicate, via tactile interaction, an identification of the account associated with the account card or a card type of the account card.

In another example, a card system can provide access to a set of accounts. The card system can include a first account card and a second account card. The first account card can include first sides and a first identification embossing for providing access to a first account. The first sides can be connected to form a first shape. The first identification embossing can be associated with at least one side of the first sides. The at least one side of the first sides associated with the first identification embossing can include (i) a first thickness that is different than a second thickness associated with other sides of the first sides and (ii) a first arrangement of one or more tactile features configured to indicate, via tactile interaction, an identification of the first account associated with the first account card or a card type of the first account card. The second account card can include second sides and a second identification embossing for providing access to a second account. The second sides can be connected to form a second shape. The second identification embossing can be associated with at least one side of the second sides. The at least one side of the second sides that is associated with the second identification embossing can include (i) a third thickness that is different than a fourth thickness associated with other sides of the second sides and (ii) a second arrangement of one or more tactile features configured to indicate, via tactile interaction, an identification of the second account associated with the second account card or a card type of the second account card.

In a further example, a method can provide access to an account via an account card. The account card can be received, and the account card can include sides and an identification embossing for providing access to the account. The sides can be connected to form a shape. The identification embossing can be associated with at least one side of the side. The at least one side of the plurality of sides that is associated with the identification embossing can include (i) a first thickness that is different than a second thickness associated with other sides of the sides and (ii) an arrangement of one or more tactile features configured to indicate, via tactile interaction, an identification of the account associated with the account card or a card type of the account card. An account associated with the account card can be determined via the identification embossing. An orientation of the account card can be determined via the identification embossing. The account associated with the account card can be accessed based on the orientation and using the account card.

BRIEF DESCRIPTION OF THE DRAWINGS

FIG. 4 is a flowchart of a process to use an account card having an identification embossing or a textured directional feature according to one example of the present disclosure.

DETAILED DESCRIPTION

Figure 1:
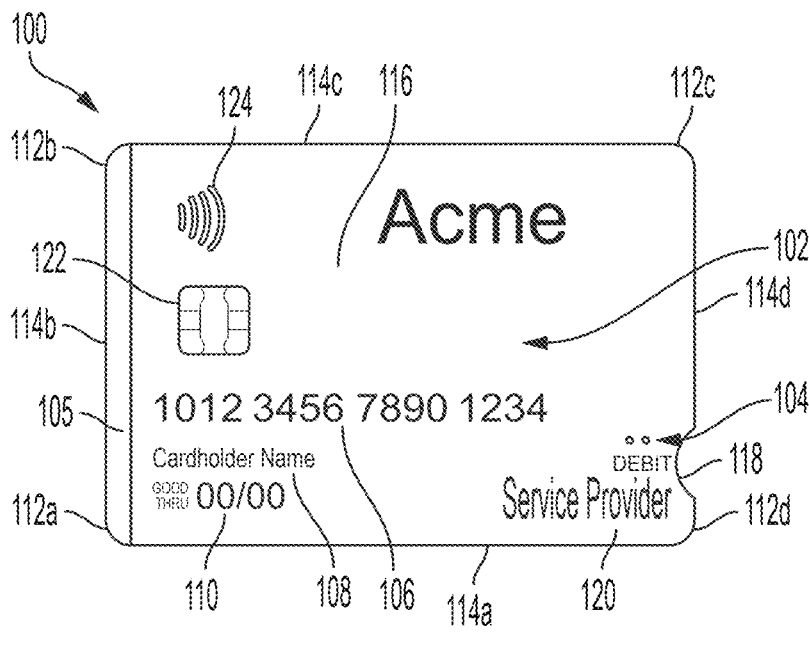
FIG. 1 is a diagram of an example of a front side of an accessible account card having an identification embossing or a textured directional feature according to one example of the present disclosure.

Certain aspects and features of the present disclosure relate to an accessible account card that includes an identification embossing for providing access to an account regardless of disability. The accessible account card can be provided to a first entity, such as a user of services, by a second entity, such as a provider of services, and can be associated with the account. The account can include confidential or otherwise sensitive information. For example, the account can include a medical account, a financial account, an information technology account, or other suitable types of accounts. The first entity can include a user or other suitable type of account holder that controls the account with the second entity, which can include various suitable types of account providers such as a medical provider, a financial services provider, an information technology services provider, and the like. The accessible account card can be used, for example by the first entity, to access the account. The identification embossing can include a raised surface, one or more notches, a textured feature, other suitable features, or a combination thereof that can allow the first entity to identify and use the accessible account card regardless of any disability or challenge experienced by the first entity. In an example in which the first entity cannot visually perceive the account card, the identification embossing can allow the first entity to physically perceive or experience an identity of the accessible account card, and the like.

Other account cards may not provide access to an account to one or more entities. For example, the other account cards may be physically similar or identical to one another and, thus, may not be distinguishable via physical perception or tactile interaction. For example, the other account cards may include similar or identical dimensions, similar or identical shapes or sizes, similar or identical identification features, etc. Additionally, the other account cards may include hard-to-read information associated with the account. For example, the other account cards may include small-print information, low-contrast information, excessive amounts of information, other types of hard-to-read information, or any suitable combination thereof. In some examples, an entity that experiences visual challenges, such as blindness, colorblindness, location-based visual impairment, etc., may not be able to determine the hard-to-read information. Accordingly, the entity may not be able to determine a direction of the other account cards, to determine an identity of the other account cards, to access the account using the other account cards, etc.

An accessible account card can provide increased access to an account compared to the other account cards. For example, the accessible account card can provide access to the account for an entity having one or more disabilities or that is experiencing other similar challenges. The entity may experience visual impairment such as blindness, colorblindness, location-based visual impairment, such as far-sightedness or near-sightedness, or other similar form of visual impairment. Additionally or alternatively, the entity may experience barriers within the physical environment (e.g., various cards may be identical, challenges in determining orientation of the card when inserting the card in a computing device, etc.) or the digital environment such as difficulty reading the print on a card when providing account information or determining a direction of the account card, etc. The accessible account card can be used by the entity regardless of disability or other challenge, which would prevent the entity from accessing the account using the other account cards, experienced by the entity.

The accessible account card can include an identification embossing, a textured directional feature, or a combination thereof that can provide accessibility to an entity to which the accessible account card is issued. For example, the identification embossing can allow the entity to identify, via tactile interaction, visual inspection, or the like, the accessible account card, and the textured directional feature can allow the entity to determine, via tactile interaction, visual inspection, or the like, an orientation of the accessible account card.

The identification embossing can be positioned on a corner of the accessible account card and may include a height that is different than the other corners of the accessible account card. For example, the other corners of the accessible account card may be flat, while the identification embossing may be raised out of, or below, the surface of the accessible account card or otherwise arranged such that tactile interaction may allow the entity to use the identification embossing to identify the accessible account card. Additionally or alternatively to being raised out of, or below, the surface of the accessible account card, the identification embossing can include other suitable tactile features. For example, the other suitable tactile features can include one or more notches, one or more different materials, or the like. A notch can include a piece of removed material from the accessible account card. The different materials can include different roughness or other suitable features of the accessible account card that can be detected via physical touch or tactile interaction. The other suitable tactile features can be positioned in a corner of the accessible account card or in other locations, such as along an edge, in the middle, etc., with respect to the accessible account card.

Additionally, the textured directional feature can be positioned along an edge of the accessible account card and may include one or more textured features that are different than features of the other edges of the accessible account card. For example, the other edges of the accessible account may be flat, smooth, or a combination thereof, while the textured directional feature may be rough or otherwise arranged such that tactile interaction may allow the entity to use the textured directional feature to determine an orientation of the accessible account card. Additionally or alternatively to being rough, the textured directional feature can include other tactile features. For example, the other tactile features can include one or more notches, one or more different materials, one or more differences in height or thickness, or the like. The differences in height or thickness can involve the textured directional feature being raised, or lowered, with respect to an average thickness of the accessible account card. Additionally or alternatively, the differences in height or thickness can involve the textured directional feature having a thickness different than a thickness of the accessible account card. The other suitable tactile features can be positioned along an edge of the accessible account card or in other locations, such as in a corner, in the middle, etc., with respect to the accessible account card.

Additionally, the accessible account card can include account information that is easy-to-read. For example, the account information can be optimized, such as minimized, to avoid including excessive amounts of account information on the accessible account card. The account information can include an entity name, an account number, a security code, a contact number, other suitable account information, or any combination thereof. In some examples, the account information may be easy-to-read based on various parameters such as font type, font size, contrast, and other parameters.

The font type can be determined based on readability, which may include a measure of visual perception, of the font type. For example, the accessible account card may include a font type, such as Calibri, Times New Roman, Arial, and the like, that is optimized for readability. For example, a selected font type may be the easiest to read or otherwise visually perceive. In some examples, the font type can include bolded features, underlined features, or other features for increasing the readability of the font compared to other fonts. The font size can be larger than font size of the other account cards. For example, the font size of the account information can be maximized for placement in respective locations on the accessible account card. The contrast can include a minimum contrast ratio. For example, the minimum contrast ratio can be 3.5, 4.0, 4.65, or any other suitable contrast ratio value for the accessible account card. In some examples, the contrast ratio can be any suitable value from 4.65 to 21. The contrast ratio of the account information, for example with respect to the accessible account card, can allow the entity to more easily (e.g., compared to other account cards) read the account information. Additionally, the font size can be within a predetermined range, which may be from 14 point font to 72 point font, or any other suitable range for font for the accessible account card.

Manufacturing the accessible account card can be easier than manufacturing other account cards. For example, other account cards may include irregular shapes or may include excessive amounts of material. The irregular shapes may include non-continuous edges or other irregular shapes that are difficult to manufacture. The accessible account card may include continuous edges and may reduce an amount of material, for example compared to the other account cards, used to manufacture the accessible account card. For example, the identification embossing and the textured directional feature may allow the accessible account card to be continuous and may reduce the amount of material used to manufacture the accessible account card. Additionally, the accessible account card may be less difficult to manufacture compared to the other account cards.

These illustrative examples are given to introduce the reader to the general subject matter discussed here and are not intended to limit the scope of the disclosed concepts. In the following description, for the purposes of explanation, specific details are set forth to provide a thorough understanding of various implementations and examples. Various implementations may be practiced without these specific details. The figures and description are not intended to be restrictive.

FIG. 1 is a diagram of an example of a front side 102 of an accessible account card 100 having an identification embossing 104 or a textured directional feature 105 according to one example of the present disclosure. In some examples, the front side 102 of the accessible account card 100 may include the identification embossing 104 and the textured directional feature 105. The front side 102 of the accessible account card 100 can additionally include a first set of account information. For example, the first set of account information can include an account number 106, an entity name 108, and an account expiration date 110. The front side 102 of the accessible account card 100 can include any other information or features for providing accessibility to the entity.

As illustrated, the accessible account card 100 is approximately rectangular-like shaped, though the accessible account card 100 may be approximately other shapes such as a square, an ellipse, a trapezoid, irregular shapes, or the like. The accessible account card 100 can include four corners 112a-d, four edges 114a-d, and a background 116. The four corners 112a-d and the four edges 114a-d may be respectively connected to form an outline (e.g., a shape) of the accessible account card 100, and the background 116 may be, may be included in, or may include an interior region of the accessible account card 100. For example, the corner 112a can be connected to the corner 112b via the edge 114b, which can extend from the corner 112a to the corner 112b. The corner 112b can be connected to the corner 112c via the edge 114c, which can extend from the corner 112b to the corner 112c. The corner 112c can be connected to the corner 112d via the edge 114d, which can extend from the corner 112c to the corner 112d. The corner 112d can be connected to the corner 112a via the edge 114a, which can extend from the corner 112d to the corner 112a. The corners 112a-d and the edges 114a-d can be otherwise arranged for allowing the accessible account card 100 to provide account access to the entity.

As illustrated, the identification embossing 104 is positioned in a lower-rear portion, for example the corner 112d, of the front side 102 of the accessible account card 100. The identification embossing 104 can be positioned in any other suitable location, such as along one or more edges 114, in one or more other suitable corners 112, etc., with respect to the accessible account card 100. The identification embossing 104 can be raised above, or below, an average thickness or height of the accessible account card 100 or the other sides, corners, edges, etc. thereof. In some examples, the identification embossing 104 can additionally include a notch 118 that can, in combination with the identification embossing 104, allow the entity to determine, via tactile interaction or visual perception, the identity of the accessible account card 100. The notch 118 may include a portion of the accessible account card 100 that was removed or otherwise altered to form the notch 118. In some examples, the identification embossing 104 may be positioned proximate to a visual card identifier 120, which may visually indicate a type of card of the accessible account card 100. Additionally or alternatively, the identification embossing 104 can include an arrangement of one or more tactile features that may be configured to indicate, via tactile interaction by the entity, an identification of the account associated with the accessible account card 100 or a card type (e.g., (i) credit, debit, or prepaid, (ii) associated with a particular provider of services, or the like) of the accessible account card 100.

As illustrated, the textured directional feature 105 is positioned along a front edge, for example the edge 114b, of the front side 102 of the accessible account card 100. The textured directional feature 105 can be positioned in any other suitable location, such as along one or more other edges 114, in one or more suitable corners 112, etc., with respect to the accessible account card 100. The textured directional feature 105 can include a rough texture, such as a matte or sandy texture, though other suitable textures, such as lumpy, rubbery, and soft, are possible for the textured directional feature 105. The textured directional feature 105 can be positioned to indicate, via tactile interaction or visual inspection, an orientation of the accessible account card 100. The orientation of the accessible account card 100 can include one or more directions of the accessible account card 100. For example, the textured directional feature 105 can be used, via tactile interaction, by the entity to determine which side (e.g., front side 102 or back side) is facing up, which edge among the edges 114a-d is facing left, and the like.

Additionally or alternatively, the identification embossing 104, the textured directional feature 105, or a combination thereof may include other suitable features. For example, the identification embossing 104, the textured directional feature 105, or a combination thereof can include a notch, a raised surface, different materials, or other suitable features for providing access to the account for the entity. The notch can include a removed piece of material. For example, the identification embossing 104, the textured directional feature 105, or a combination thereof can be positioned in the corner 112d, and a portion of the corner 112d can be removed to form the notch. The raised surface can involve a portion of the identification embossing 104, the textured directional feature 105, or a combination thereof having a different height or thickness than other portions of the accessible account card 100. In examples in which the accessible account card 100 is positioned on a flat surface, the raised surface of the identification embossing 104, the textured directional feature 105, or a combination thereof may rise above, or below, an average height value of the accessible account card 100. The different materials of the identification embossing 104, the textured directional feature 105, or a combination thereof may provide distinguishable surface differences detectable, for example via tactile interaction, by the entity. For example, the different materials can include plastic, metal, such as unfinished metal, finished metal, or the like, or other suitable materials, and the different materials can include different surface finishes such as coating for additional roughness, polishing for additional smoothness, and the like. The other suitable features can be positioned on other portions, such as one or more edges 114, one or more corners 112, etc., other than those illustrated with respect to the accessible account card 100.

The first set of account information included with the accessible account card 100 can be positioned in various locations with respect to the accessible account card 100. For example, the first set of account information can be positioned on the background 116, such as within the outline formed by the corners 112*a-d* and the edges 114*a-d*, of the accessible account card 100. The first set of account information can include the account number 106, the entity name 108, the account expiration date 110, other suitable account information, or any combination thereof.

The account number 106 can be approximately centrally positioned with respect to the accessible account card 100. For example, a first distance between the account number 106 and the edge 114*b* may be similar or identical to a second distance between the account number 106 and the edge 114*d*. Additionally, a third distance between the account number 106 and the edge 114*c* may be similar or identical to a fourth distance between the account number 106 and the edge 114*a*. As illustrated, the accessible account card 100 is a financial account card. Thus, the account number 106 is illustrated as positioned closer to the edge 114*a* than the edge 114*c* to allow space on the accessible account card for a chip 122 for facilitating various interactions. Additionally, the chip 122 can be positioned proximate to a touchless interaction indicator 124 that can indicate the accessible account card 100 can be used without physically inserting the accessible account card 100 into a computing device. The entity name 108 can be positioned below the account number 106, and the entity name 108 can correspond to the account number 106. For example, the entity name 108 may be the name of an entity that controls an account corresponding to the account number 106. The account expiration date 110 can be positioned below the entity name 108 and can indicate an expiration of the accessible account card 100, the account associated with the accessible account card 100, other suitable information, or any combination thereof.

The first set of account information can include various parameters that may optimize a readability of the first set of account information for providing accessibility for the entity to the account. For example, the parameters can include a font type, a font size, a contrast ratio, an amount of information, other suitable parameters, or any suitable combination thereof. The font type can be determined based on the readability of the font type. For example, the accessible account card may include a font type, such as Calibri, Times New Roman, Arial, etc., that is optimized for ease-of-readability. In some examples, the font type can include bolded features, underlined features, or other features for increasing the readability of the font compared to other fonts. The font size of the first set of account information can be maximized for placement in respective locations on the accessible account card 100. For example, the account number 106 can be determined to be the maximum possible font size for fitting the account number 106 on the front side 102 of the accessible account card 100. The contrast ratio can include a minimum contrast ratio. For example, the first set of account information may be positioned on the accessible account card 100 having a contrast ratio greater than or equal to the minimum contrast ratio. The minimum contrast ratio can be 3.5, 4.0, 4.65, or any other suitable contrast ratio value for the accessible account card 100. In some examples, the contrast ratio of the first set of account information, for example with respect to the accessible account card, can allow the entity to more easily (e.g., compared to other account cards) read the first set of account information.

The identification embossing 104, the textured directional feature 105, or a combination thereof can provide an increased amount of accessibility, for example compared to account cards without the identified features, for an entity that may experience visual impairment or other similar challenges within the physical environment or the digital environment. For example, the identification embossing 104 can indicate to the entity a type, such as a financial card, a medical card, etc., of the accessible account card 100 or the account associated with the accessible account card 100. Additionally, the textured directional feature 105 can indicate to the entity an orientation of the accessible account card 100. For example, the entity can physically interact with the textured directional feature, and the entity can determine that the accessible account card 100 is positioned correctly, for example for inserting the accessible account card 100 into a computing device for accessing the account.

Figure 2:
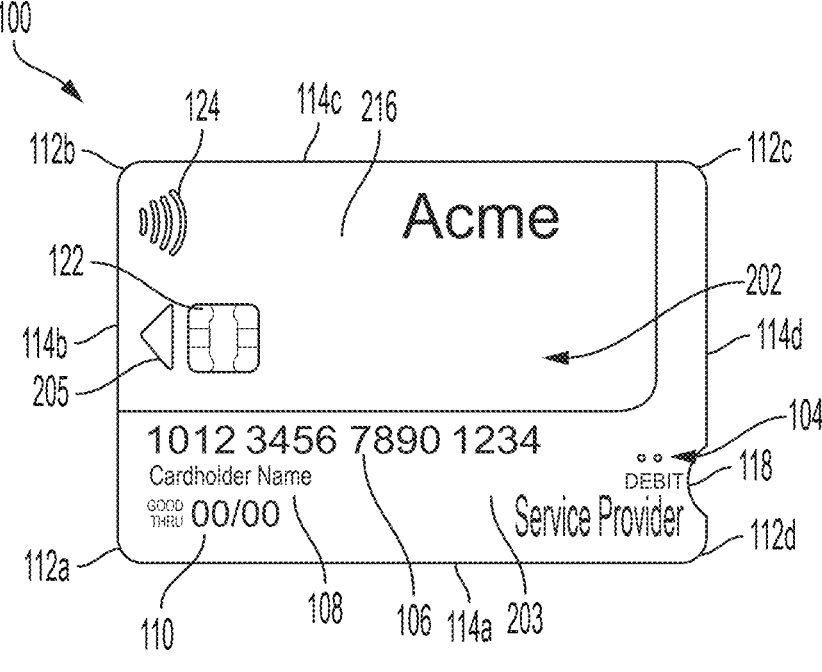
FIG. 2 is a diagram of another example of a front side of an accessible account card having an identification embossing or a textured directional feature according to one example of the present disclosure.

FIG. 2 is a diagram of another example of a front side 202 of an accessible account card 100 having an identification embossing 104 or a textured directional feature 105 according to one example of the present disclosure. In some examples, the front side 202 of the accessible account card 100 may include the identification embossing 104 and the textured directional feature 105. The front side 202 of the accessible account card 100 can additionally include a first set of account information. The front side 202 of the accessible account card 100 can include any other information or features for providing accessibility to the entity.

As illustrated, the front side 202 may be similar to the front side 102. In some examples, the front side 202 may include a different background 216 than the front side 102, a different textured directional feature 205 than the front side 102, etc. The different background 216 may include two or more contrast colors that may visually draw attention to important information. For example, a first portion 203 of the different background 216 can be a first color that draws attention to the first set of account information. Additionally, the different textured directional feature 205 may be shaped as an arrow and may include a textured surface for tactile interaction. For example, the different textured directional feature 205 may be rough or otherwise include a texture different than other portions of the accessible account card 100, and the entity can use, via tactile interaction, the different textured directional feature 205 to determine an orientation of the accessible account card 100. While illustrated as an arrow, the different textured directional feature 205 can include any other shapes, such as a triangle, a rectangle, an ellipse, irregular shapes, and the like.

Figure 3:
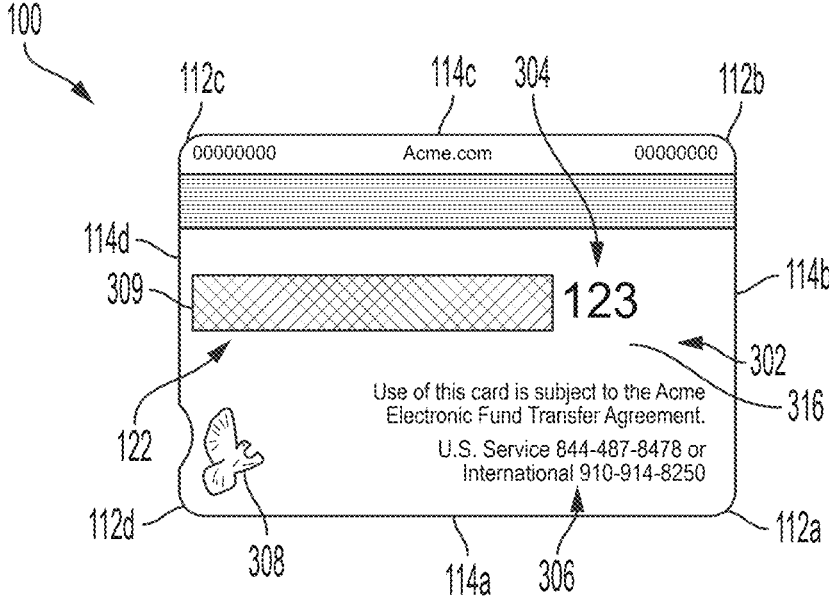
FIG. 3 is a diagram of an example of a back side of an accessible account card having an identification embossing or a textured directional feature according to one example of the present disclosure.

FIG. 3 is a diagram of an example of a back side 302 of the accessible account card 100 having an identification embossing 104 or a textured directional feature 105 according to one example of the present disclosure. As illustrated in FIG. 3, the back side 302 of the accessible account card 100 includes the corners 112a-d, the edges 114a-d, and a background 316 arranged similarly to (but mirrored with respect to) the corners 112a-d, the edges 114a-d, and the background 116 illustrated in FIG. 1. Additionally, the back side 302 of the accessible account card 100 can include a second set of account information that may be different than the first set of account information illustrated and described with respect to FIG. 1. For example, the second set of account information can include a security code 304, contact information 306 for a provider entity, a country indicator 308, other suitable information, or any suitable combination thereof.

As illustrated, the identification embossing 104 may not be positioned on the back side 302 of the accessible account card 100. In some examples, the identification embossing 104 may be positioned on a portion of the back side 302 of the accessible account card 100 that corresponds to the lower-right portion of the front side 102, or other location corresponding to the positioning of the identification embossing 104 on the front side 102. For example, the identification embossing 104 can be positioned corresponding to the corner 112d of the back side 302 of the accessible account card 100. Accordingly, the identification embossing 104 can be used, regardless of the side of the accessible account card 100 physically interacted with by the entity, by the entity to identify the accessible account card 100, and the like.

As illustrated, the textured directional feature 105 may not be positioned on the back side 302 of the accessible account card 100. In some examples, the textured directional feature 105 may be positioned on a portion of the back side 302 of the accessible account card 100 that corresponds to a front end (e.g., the edge 114b) of the front side 102, or other location corresponding to the positioning of the textured directional feature 105 on the front side 102. For example, the textured directional feature 105 can be positioned corresponding to the edge 114b of the back side 302 of the accessible account card 100. Accordingly, the textured directional feature 105 can be used, regardless of the side of the accessible account card 100 physically interacted with by the entity, by the entity to determine an orientation of the accessible account card 100, and the like.

The second set of information can include the security code 304, the contact information 306, the country indicator 308, etc. As illustrated, the accessible account card 100 is a financial account card. Thus, the accessible account card 100 can include the security code 304, which can be an additional security feature of the account. Additionally, the contact information 306 can include a phone number, an email, a webpage URL, or any other suitable contact information. The contact information 306 can be associated with a providing entity. For example, the contact information 306 can be used by the entity that is issued the accessible account card 100 to contact the providing entity. The country indicator 308 can indicate the country of origin of the providing entity, of the accessible account card 100, and the like.

As illustrated, the security code 304 is positioned adjacent to a signature line 309, which can be sized to receive a signature, or other confirmation that indicates acceptance of terms associated with the account or other suitable indications, from the entity. Additionally, the contact information 306 and the country indicator 308 can be positioned on a bottom portion of the back side 302 of the accessible account card 100. The second set of account information, or any suitable subset thereof, can be positioned in other suitable locations with respect to the back side 302 of the accessible account card 100.

The second set of account information can include various parameters that may optimize a readability of the second set of account information for providing accessibility for the entity to the account. For example, the parameters can include a font type, a font size, a contrast ratio, an amount of information, other suitable parameters, or any suitable combination thereof. The font type can be determined based on the readability of the font type. For example, the second set of account information may include a font type, such as Calibri, Times New Roman, Arial, and the like, that is optimized for readability. In some examples, the font type can include bolded features, underlined features, or other features for increasing the readability of the font. The font size of the second set of account information can be maximized for placement in respective locations on the accessible account card. For example, the contact information 306 can be determined to be the maximum possible font size for fitting the contact information 306 on the back side 302 of the accessible account card 100. The contrast ratio can include a minimum contrast ratio. For example, the second set of account information may be positioned on the accessible account card 100 having a contrast ratio, for example between the second set of account information and the background 316, greater than or equal to the minimum contrast ratio. The minimum contrast ratio can be 3.5, 4.0, 4.65, or any other suitable contrast ratio value for the accessible account card 100. In some examples, the contrast of the second set of account information, with respect to the accessible account card 100, can allow the entity to more easily (e.g., compared to other account cards) read the second set of account information.

The front side 102, or the front side 202, of the accessible account card 100 and the back side 302 of the accessible account card 100 can be used for accessing an associated account. For example, a using entity, such as a user of one or more various services associated with the accessible account card 100, can be issued the accessible account card 100 by a providing entity such as a provider of the one or more various services. The using entity may have a disability and experience one or more physical barriers, one or more digital barriers, or a combination thereof. The disabilities can include visual impairment, such as blindness, colorblindness, location-based visual impairment, etc., or other similar disabilities. The digital barriers can include challenges relating to accessing an online version of the account associated with the accessible account card 100. The using entity can overcome the physical barriers, the digital barriers, or a combination thereof with respect to the account using the accessible account card 100. For example, the using entity can use, via tactile interaction, the identification embossing 104, the textured directional feature 105, or a combination thereof of the accessible account card 100 to identify the accessible account card 100 and the associated account, to determine an orientation or direction of the accessible account card 100, or a combination thereof. Additionally, the using entity can determine, for example via visual interaction, account information provided by the accessible account card 100 regardless of visual impairments such as colorblindness, location-based visual impairment, and the like.

In some examples, the accessible account card 100 can be included in a set of account cards. For example, the accessible account card 100 can be a first account card, and the set of account cards can include a second account card. The second account card may be similar to the first account card, but the second account card may not be identical to the first account card. For example, the second account card can include corners 112 and the edges 114, but the identification embossing and the textured directional feature of the second account card may be different than those of the first account card. For example, the second account card can include a second identification embossing that is different than the identification embossing 104. Additionally or alternatively, the second account card can include the different textured directional feature 205 compared to the textured directional feature 105 of the accessible account card 100.

Accordingly, a using entity can determine that the second account card is different than the accessible account card 100. For example, the using entity can determine, via tactile interaction, that the different textured directional feature 205 is different than the textured directional feature 105, that the identification embossing 104 is different than the second identification embossing, or a combination thereof. Determining the difference (i) between the textured directional feature 105 and the different textured directional feature 205 or (ii) between the identification embossing 104 and the second identification embossing can indicate to the using entity the accounts associated with the respective account cards, a type of the cards, and the like. Accordingly, the using entity can successfully select an account card corresponding to a desired account based on the identification embossing or the textured directional feature.

FIG. 4 is a flowchart of a process 400 to use an accessible account card 100 according to one example of the present disclosure. At block 402, an accessible account card 100 is received. The accessible account card 100 can include a set of sides, for example the corners 112 or the edges 114, the identification embossing 104, the textured directional feature 105, or a combination thereof. The identification embossing 104 or the textured directional feature 105 can include various features, such as those described with respect to FIG. 1, that can indicate an orientation of the accessible account card 100, an account associated with the accessible account card 100, a type of card of the accessible account card 100, or any combination thereof. In some examples, a providing entity, such as a financial services institution, an information technology services institution, and the like, can provide the accessible account card 100 to a receiving entity, such as a user of various services, which may experience visual or other similar challenges.

At block 404, an account associated with the accessible account card 100 can be determined. The using entity can use the identification embossing 104, the textured directional feature 105, or a combination thereof to determine the account that is associated with the accessible account card 100. For example, the using entity can physically determine, via tactile interaction, that the identification embossing 104 corresponds to the account. The using entity can use the identification embossing 104 in other suitable manners to determine the account associated with the accessible account card 100. Additionally or alternatively, the using entity can use the textured directional feature 105 to determine the account associated with the accessible account card 100.

At block 406, an orientation of the accessible account card 100 can be determined. The using entity can use the identification embossing 104, the textured directional feature 105, or a combination thereof to determine the orientation of the accessible account card 100. For example, the using entity can physically determine, via tactile interaction of the identification embossing 104, the textured directional feature 105, or a combination thereof the orientation of the accessible account card 100. In some examples, the orientation can include a direction of the accessible account card 100. For example, the using entity can physically interact with the identification embossing 104, the textured directional feature 105, or a combination thereof to determine which direction, or other suitable measures of orientation, the accessible account card 100 is facing.

At block 408, the account can be accessed using the accessible account card 100. For example, in response to determining the account associated with the accessible account card 100 and the orientation of the accessible account card 100, the using entity can access the account. In some examples, the using entity can access the account via a physical device such as an automatic teller machine, or the like. In other examples, the using entity can determine account information, for example associated with the account, based on the accessible account card 100 and can use the account information to access, via a personal computing device, etc., an online version of the account. The account can be accessed, in response to determining the account associated with the accessible account card 100 and the orientation of the accessible account card 100, by the using entity via other suitable techniques.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing the claims. And, although the subject matter has been described with reference to financial account systems and financial account data, various aspects disclosed herein can be applicable to other types of account systems and other types of data.

The invention claimed is:

1. An account card comprising:
   a plurality of sides that are connected to form a shape, the plurality of sides comprising four edges that connect to form the shape; and
   an identification embossing for providing access to an account, the identification embossing associated with at least one side of the plurality of sides, wherein:
      the at least one side of the plurality of sides that is associated with the identification embossing includes a notch that is concave with respect to the at least one side between a first point on the at least one side and a second point on the at least one side, the notch having a first radius-of-curvature that is larger than a second radius-of curvature of each corner of a plurality of corners included in the shape;
      a particular side of the plurality of sides comprises a textured directional feature that is configured to indicate, in response to tactile interaction from an entity, an orientation of the account card, the particular side different than the at least one side; and
      a first thickness of the at least one side is different than a second thickness associated with other sides of the plurality of sides.

2. The account card of claim 1, wherein the identification embossing further comprises an arrangement of one or more tactile features configured to indicate, via tactile interaction, an identification of the account associated with the account card or a card type of the account card.

3. The account card of claim 1, further comprising:
   a first edge;
   a second edge positioned opposite the first edge;

a third edge connected to the first edge via a first corner, wherein the third edge is connected to the second edge via a second corner that is substantially the same as the first corner; and a fourth edge that is positioned opposite the third edge, wherein the fourth edge is connected to the first edge via a third corner that is substantially the same as the first corner and the second corner, wherein the fourth edge is connected to the second edge via a fourth corner that is different than the first corner, the second corner, and the third corner, and wherein the fourth corner comprises the identification embossing.

4. The account card of claim 1, further comprising:

a front side comprising a first background that includes a first set of account information; and a back side positioned opposite from the front side, wherein the back side comprises a second background that includes a second set of account information, wherein the second set of account information is different than the first set of account information.

5. The account card of claim 4, further comprising one or more tactile features that comprise one or more raised surfaces that (i) rise above an average height of the front side of the account card or (ii) stoop below the average height of the front side of the account card, and wherein an arrangement of the one or more tactile features corresponds to a providing entity from which the account card is providable.

6. The account card of claim 4, wherein:

the first set of account information includes an account number associated with the account, an entity name associated with the account, and an expiration date associated with the account; and the second set of account information includes a security code associated with the account, a confirmation line associated with the account, and contact information associated with the account.

7. The account card of claim 4, wherein the first background and the second background each include a set of parameters that optimize a visual perception of the first set of account information and a visual perception of the second set of account information, and wherein the set of parameters include a contrast ratio, a font type, a font size, and an amount of information, and wherein the contrast ratio is from 4.65 to 21.

8. The account card of claim 1, wherein the textured directional feature comprises a first feature that is configured to indicate, via tactile interaction, a type of account associated with the account card, and wherein the first feature comprises a first surface of the account card with a first texture that is different from a second texture of a second surface of the account card not included in the textured directional feature, wherein the first surface has a non-zero area and extends along a line from a first point along a first edge of the four edges to a second point along a second edge opposite the first edge, and wherein the line is parallel to a third edge of the four edges.

9. The account card of claim 8, wherein the textured directional feature further comprises a second feature that is configured to indicate, in response to tactile interaction from the entity, the orientation of the account card, wherein the orientation includes a direction that the account card is facing, wherein the second feature comprises a plurality of tactile features arranged as an arrow pointing in the direction, and wherein the plurality of tactile features is adjacent to a fourth edge of the four edges that is opposite the third edge.

10. A card system comprising:

a first account card comprising:

a first plurality of sides that are connected to form a first shape, the first plurality of sides comprising four first edges that connect to form the first shape; and a first identification embossing for providing access to a first account, the first identification embossing associated with at least one side of the first plurality of sides, wherein:

the at least one side of the first plurality of sides associated with the first identification embossing includes a first notch that is concave with respect to the at least one side between a first point on the at least one side and a second point on the at least one side, the first notch having a first radius-of-curvature that is larger than a second radius-of-curvature of each corner of a first plurality of corners included in the first shape;

a first particular side of the first plurality of sides comprises a first textured directional feature that is configured to indicate, in response to tactile interaction from an entity, a first orientation of the first account card, the first particular side different than the at least one side of the first plurality of sides;

a first thickness of the at least one side of the first plurality of sides is different than a second thickness associated with other sides of the first plurality of sides; and a second account card comprising:

a second plurality of sides that are connected to form a second shape, the second plurality of sides comprising four second edges that connect to form the second shape; and a second identification embossing for providing access to a second account, the second identification embossing associated with at least one side of the second plurality of sides, wherein:

the at least one side of the second plurality of sides that is associated with the second identification embossing includes a second notch that is concave with respect to the at least one side between a third point on the at least one side and a fourth point on the at least one side, the second notch having a third radius-of-curvature that is larger than a fourth radius-of curvature of each corner of a second plurality of corners included in the second shape;

a second particular side of the second plurality of sides comprises a second textured directional feature that is configured to indicate, in response to tactile interaction from an entity, a second orientation of the second account card, the second particular side different than the at least one side of the second plurality of sides; and a third thickness of the at least one side of the second plurality of sides is different than a fourth thickness associated with other sides of the second plurality of sides.

11. The card system of claim 10, wherein the first identification embossing further comprises an arrangement of one or more tactile features configured to indicate, via tactile interaction, an identification of the first account associated with the first account card or a card type of the first account card.

12. The card system of claim 11, wherein the first account card and the second account card each further comprise:

a first edge;

a second edge positioned opposite the first edge;

a third edge connected to the first edge via a first corner, wherein the third edge is connected to the second edge via a second corner that is substantially the same as the first corner; and a fourth edge that is positioned opposite the third edge, wherein the fourth edge is connected to the first edge via a third corner that is substantially the same as the first corner and the second corner, wherein the fourth edge is connected to the second edge via a fourth corner that is different than the first corner, the second corner, and the third corner, wherein the fourth corner of the first account card comprises the first identification embossing, and wherein the fourth corner of the second account card comprises the second identification embossing, wherein the fourth corner of the first account card is sized differently than the fourth corner of the second account card, and wherein the first identification embossing is different than the second identification embossing.

13. The card system of claim 12, wherein the first thickness and a first arrangement are associated with the fourth corner of the first account card, wherein a third thickness and a second arrangement are associated with the fourth corner of the second account card, wherein the first thickness is different than the third thickness, and wherein the first arrangement is different than the second arrangement.

14. The card system of claim 10, wherein the first account card and the second account card each further comprise:

a front side comprising a first background that includes a first set of account information; and a back side positioned opposite from the front side, wherein the back side comprises a second background that includes a second set of account information, wherein the second set of account information is different than the first set of account information.

15. The card system of claim 14, wherein the first background and the second background each include a set of parameters that optimize a visual perception of the first set of account information and a visual perception of the second set of account information, and wherein the set of parameters include a contrast ratio, a font type, a font size, and an amount of information, and wherein the contrast ratio is from 4.65 to 21.

16. A method comprising:

receiving an account card that includes:

a plurality of sides that are connected to form a shape, the plurality of sides comprising four edges that connect to form the shape; and an identification embossing for providing access to an account, the identification embossing associated with at least one side of the plurality of sides, wherein:

the at least one side of the plurality of sides that is associated with the identification embossing includes a notch that is concave with respect to the at least one side between a first point on the at least one side and a second point on the at least one side, the notch having a first radius-of-curvature that is larger than a second radius-of curvature of each corner of a plurality of corners included in the shape; and a particular side of the plurality of sides comprises a textured directional feature that is configured to indicate, in response to tactile interaction from an entity, an orientation of the account card, the particular side different than the at least one side; and a first thickness of the at least one side is different than a second thickness associated with other sides of the plurality of sides;

determining, via the identification embossing, an account associated with the account card;

determining, via the identification embossing, an orientation of the account card; and accessing, based on the orientation and using the account card, the account associated with the account card.

17. The method of claim 16, wherein the identification embossing further comprises an arrangement of one or more tactile features configured to indicate, via tactile interaction, an identification of the account associated with the account card or a card type of the account card.

18. The method of claim 16, wherein the account card further includes:

a first edge;

a second edge positioned opposite the first edge;

a third edge connected to the first edge via a first corner, wherein the third edge is connected to the second edge via a second corner that is substantially the same as the first corner; and a fourth edge that is positioned opposite the third edge, wherein the fourth edge is connected to the first edge via a third corner that is substantially the same as the first corner and the second corner, wherein the fourth edge is connected to the second edge via a fourth corner that is different than the first corner, the second corner, and the third corner, and wherein the fourth corner comprises the identification embossing.

19. The method of claim 16, wherein the account card is a first account card, further comprising:

receiving a second account card that includes:

a second plurality of sides that are connected to form a second shape that is different than the shape; and a second identification embossing, which is different than the identification embossing, associated with at least one side of the second plurality of sides that is different than other sides of the second plurality of sides, the second identification embossing causing the at least one side of the second plurality of sides to include:

a third thickness that is different than a fourth thickness associated with other sides of the second plurality of sides; and a second arrangement of one or more tactile features configured to indicate, via tactile interaction, an identification of a second account associated with the second account card or a card type of the second account card;

determining, by comparing the identification embossing to the second identification embossing, the second account associated with the second account card;

determining, via the second identification embossing, an orientation of the second account card; and accessing, based on the orientation of the second account card and using the second account card, the second account associated with the second account card.

20. The method of claim 16, wherein one or more tactile features of the identification embossing comprise one or more raised surfaces that (i) rise above an average height of a front side of the account card or (ii) stoop below the average height of the front side of the account card, and wherein an arrangement of the one or more tactile features corresponds with a providing entity from which the account card is provided.

\* \* \* \* \*